United States Patent [19]
Tevis

[11] Patent Number: 5,882,027
[45] Date of Patent: Mar. 16, 1999

[54] FIFTH WHEEL TRAILER HITCHING TOOL AND APPARATUS

[76] Inventor: Steven A. Tevis, 24551 Trickum Rd., Houstonia, Mo. 65333

[21] Appl. No.: 568,375

[22] Filed: Dec. 7, 1995

[51] Int. Cl.[6] .................................................. B62D 53/06

[52] U.S. Cl. ........................ 280/433; 81/177.1; 81/177.8; 254/129; 254/131; 294/191; 294/26

[58] Field of Search .................................... 280/433, 430, 280/438.1, 441, 441.1, 441.2; 74/543, 544; 81/177.1, 177.8; 254/129, 130, 131; 294/19.1, 26

[56] References Cited

U.S. PATENT DOCUMENTS 1,476,877  12/1923  Curtis ........................................ 254/129

*Primary Examiner*—Kevin Hurley

[57] ABSTRACT

A method and mechanism for hitching and unhitching a fifth wheel trailer to and from a towing vehicle, including an elongate tool having a hooked end portion and a handle portion. The tool allows an operator to stand next to the towing vehicle and reach into the bed of the vehicle with the tool to operate the hitch mechanism. The hooked end portion of the tool can be used to engage a handle portion of the latch mechanism for shifting the handle to and from its latching and unlatching positions. The hooked end portion can also be used to shift a pivot plate to and from its ball confining position. The hooked end portion can also be used to open and close a door which generally encloses the ball hitch.

5 Claims, 3 Drawing Sheets

FIFTH WHEEL TRAILER HITCHING TOOL AND APPARATUS

BACKGROUND OF THE INVENTION

1) Field of the Invention

This invention relates to methods and mechanisms for hitching and unhitching a trailer to and from a towing vehicle.

2) Related Art

Trailers can be hitched to towing vehicles by a number of different types of mechanisms. One such mechanism is known as a fifth wheel trailer hitch. This type of hitch mechanism includes a device mounted on the trailer for securely latching onto a ball hitch mounted with the towing vehicle. The trailer's latching device includes a vertically extending rectangular or cylindrical tube structure that must be generally positioned over the ball hitch. The tube must then be lowered or the ball hitched raised until the ball is positioned generally within the tube structure. When the ball has been positioned within the tube structure, a plate can be pivoted into position generally beneath the spherical portion of the ball hitch. In this position, the plate generally confines or captures the ball hitch within the tube structure. An elongate pin member is typically provided for insertion into an opening defined in the plate. The pin in the opening serves to lock the plate in place so that the ball remains captured within the tube structure and the trailer remains securely hitched to the ball during transport.

A handle is typically formed at one end of the pin member which allows an operator to grasp the pin and pull it from or insert it into the opening in the plate. Mounted to the tube structure is a small cradle structure within which the upwardly shifted handle is placed when the pin has been pulled from the plate's opening. The cradle holds the handle and pin in its upwardly shifted position such that the pin does not shift downwardly into the plate opening. With the handle and pin held in this position, the plate can be pivoted to allow clearance for the ball to shift out of the tube structure to unhitch the trailer. When the handle is lifted and pivoted from the cradle a spring will bias the handle and pin downwardly for placing the pin within the plate's opening for again locking the plate in its hitched position.

Many such ball hitches are mounted beneath a door in the middle of the bed of flatbed trucks or pickup trucks. Currently the operator is therefore required to climb up and into the bed of the truck in order to open the door to expose the ball hitch. The operator must remain on the bed of the truck in order to manipulate the handle to shift the pin in and out of the opening in the plate. Furthermore, the operator must remain in the bed of the truck for pivoting the plate to and from its ball hitch capturing position. Therefore, the operator is currently required to climb up into the bed of the truck in order to hitch and unhitch conventional fifth wheel trailers. Climbing into and out of the bed can be difficult, especially since the trailers tend to be relatively large and occupy a large amount of space within the truck bed. The trailer which is positioned in close proximity behind the truck will generally block the operator from getting into and out of the bed via the tailgate. The operator is therefore often required to climb over the side wall of the truck bed, which can be relatively high and difficult to traverse. Climbing into and out of the truck bed can require a great deal of dexterity, and many people find this maneuver difficult, especially those with a disability. Furthermore, once on the truck bed the operator must manipulate the handle and plate in a cramped and confined space beneath the trailer, a process which many operators also find difficult.

Therefore, it would be desirable to provide an apparatus and method which makes hitching and unhitching a fifth wheel trailer to and from a vehicle more easy to accomplish. It would be desirable for such an apparatus and method to eliminate the need for an operator to climb up into the bed of the truck during the hitching and unhitching process.

BRIEF SUMMARY OF THE INVENTION

The present invention provides an elongate tool having a hooked end portion and a handle end portion which can be used for operating a fifth wheel trailer hitch while the operator stands on the ground next to the towing vehicle. While standing on the ground next to the bed of the truck, the operator can reach into the truck bed with the tool and engage the handle portion of the hitch mechanism. To unhitch the trailer using the tool, the operator can lift and pivot the handle of the hitch up into a cradle structure. The cradle holds the hitch handle in a raised position so that the end portion of the hitch handle becomes disengaged from the pivot plate of the latch mechanism. The operator can then use the tool to engage the pivot plate with the hooked end portion, and can thereby shift the pivot plate to its unlatched position. The ball can then be removed from the tube structure and the trailer is then unhitched from the towing vehicle.

When hitching the trailer to the towing vehicle, the operator can again engage the hitch handle portion with the hooked end portion of the tool while standing on the ground next to the towing vehicle. The operator can then easily lift the hitch handle from the cradle for allowing the end portion of the hitch handle to shift down into its locking position. The operator can then use the tool to shift the pivot plate to its latched position.

Therefore, the tool according to the present invention can be used for hitching and unhitching a trailer to a ball type hitch while the operator remains standing on the ground next to the towing vehicle. The present invention therefore, eliminates the need for the operator to climb up into the bed of the truck during latching or unlatching operations.

The hooked end portion of the present invention can also be provided with a hinge mechanism, which allows the hooked end portion to pivot with respect to the rest of the tool. The pivotable hooked end portion allows the operator to easily place the hooked end portion beneath the handle of the hitch mechanism when the handle is any of its various positions.

The present invention can also be provided with a fulcrum member that can be placed on a horizontal portion of the towing vehicle, such as the floor of the truck bed when the tool is being used for lifting and pivoting the handle of the hitch mechanism. The fulcrum member allows the tool to be used as a lever, thereby increasing the leverage and force the operator can apply to the hitch handle during the latching and unlatching process.

DETAILED DESCRIPTION OF THE INVENTION

Figure 1:
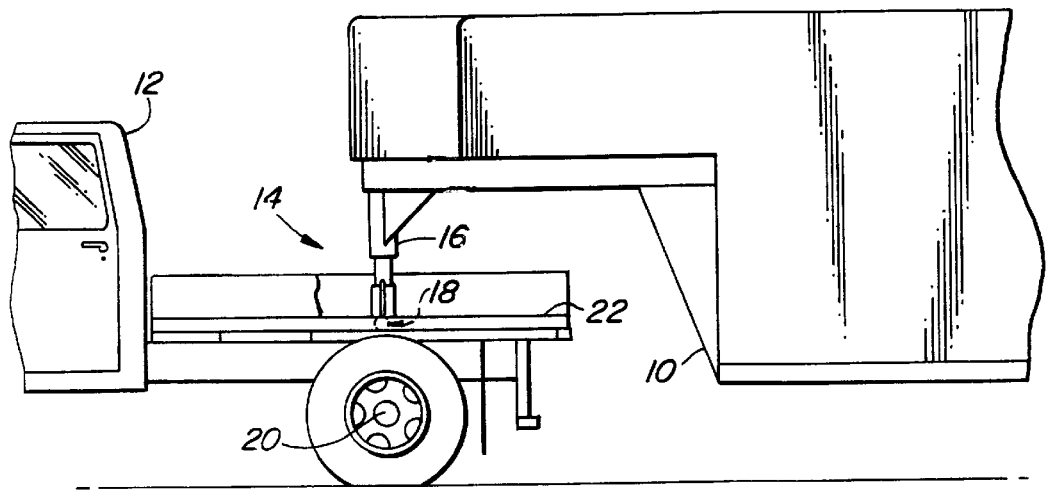
FIG. 1—is a side view of a fifth wheel trailer hitch mechanism coupling a trailer to a towing vehicle.
Figure 2:
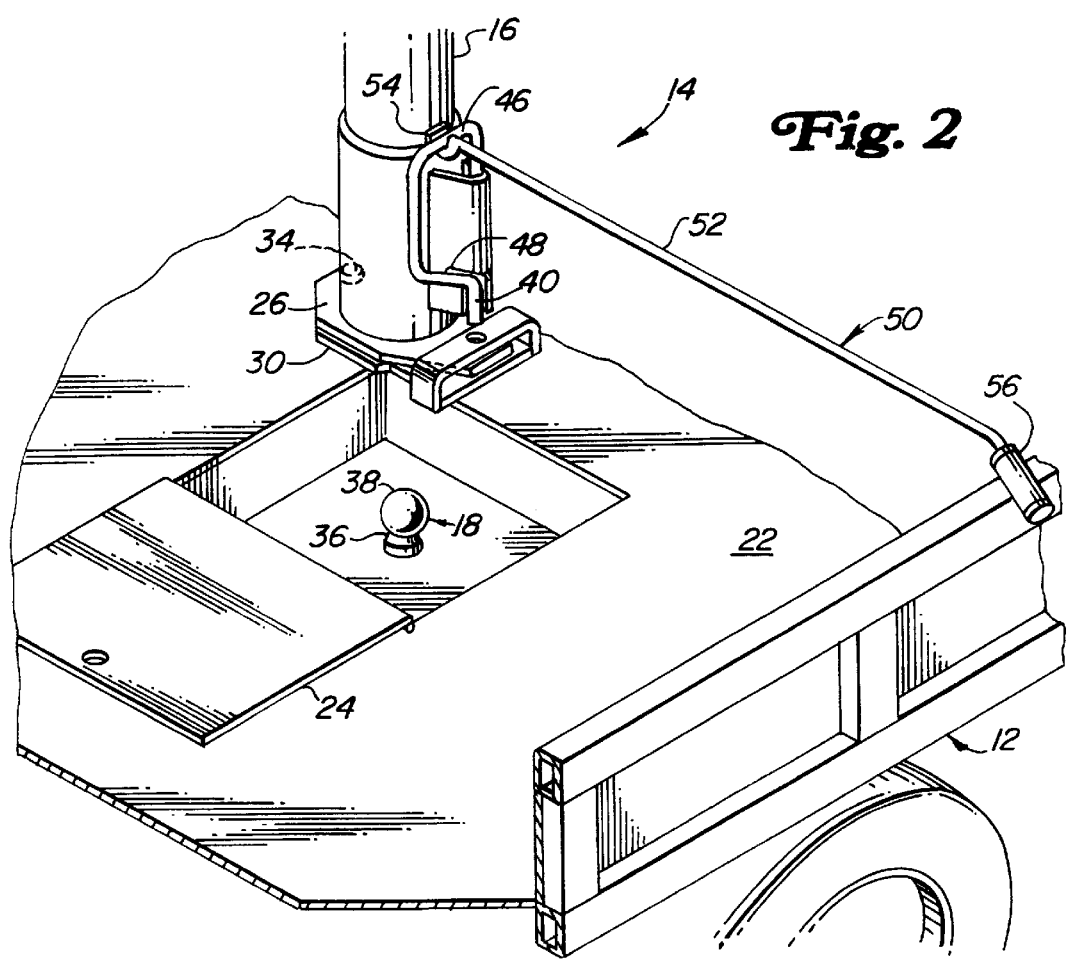
FIG. 2—is a perspective view of a fifth wheel trailer hitch mechanism about to be hitched to a ball mounted beneath a door in the bed of a truck.

Referring now to FIGS. 1 and 2, there is shown a fifth wheel trailer 10 which can be coupled with a towing vehicle 12 by a conventional hitch mechanism 14. A rectangular or cylindrical tube structure 16 extends vertically downwardly from the front portion of the trailer 10. The tube 16 is positioned over a ball hitch 18 for coupling the trailer 10 with the vehicle 12. The ball hitch 18 is typically carried over the rear axle 20 of the vehicle or truck 12. Some trucks 12 provide a truck bed 22 having a door 24 beneath which the ball hitch 18 is located.

Figure 3:
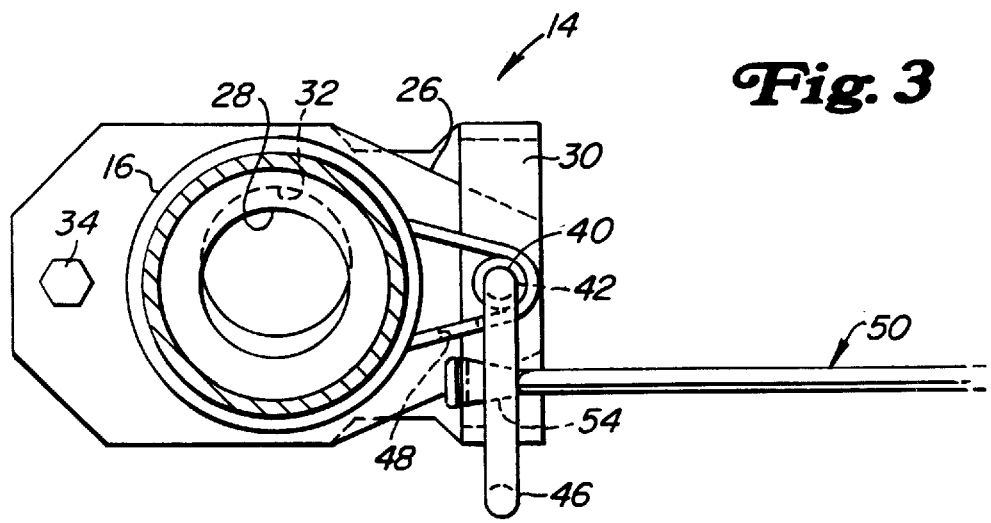
FIG. 3—is a partial sectional view of the hitch mechanism in its latched mode showing the pivot plate held in place by the pin and the opening in the pivot plate misaligned with the opening in the fixed plate for confining the ball within the tube structure.
Figure 4:
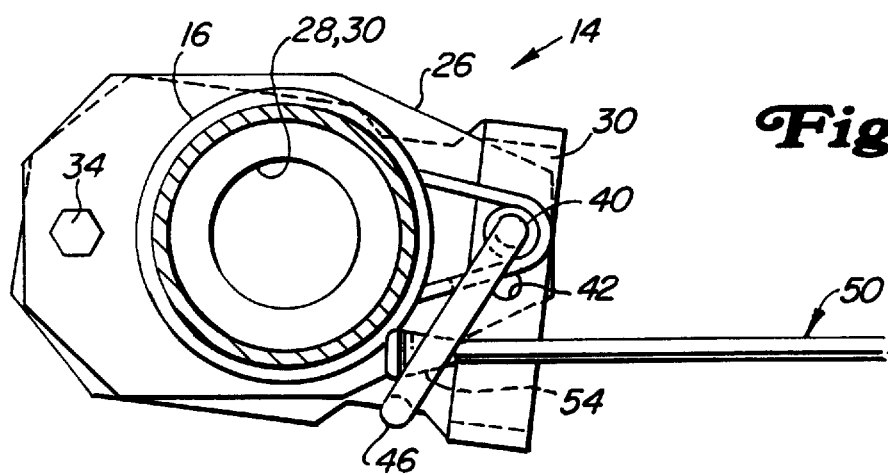
FIG. 4—is a partial sectional view showing the handle held in an upright position within the cradle and the pivot plate pivoted such that the openings are aligned for allowing the ball to pass there-through during the hitching and unhitching processes.

Conventional fifth wheel trailer hitch mechanisms 14 provide a mechanism for securely capturing or confining the ball hitch 18 within the tube 16. As seen in FIGS. 2–5, a horizontally extending plate 26 is rigidly fixed to the lower portion of the tube 16. This plate 26 includes an opening 28 large enough for the ball hitch 18 to pass therethrough. A horizontally extending pivotal plate 30 is pivotally coupled to the tube 16 directly beneath the rigidly fixed plate 26. The pivotal plate 30 also includes an opening 32 large enough for the ball hitch 18 to pass therethrough. When the openings 28 and 32 in the rigid plate 26 and pivotal plate 30 are aligned with one another, as shown in FIG. 4, the ball hitch 18 can be inserted or removed from the tube 16 for hitching and unhitching the trailer 10. With the ball hitch 18 positioned within the tube 16, the pivotal plate 30 can be swung about its pivot axis 34 to the position shown in FIG. 3, such that the openings 28 and 32 become misaligned and the narrow neck portion 36 of the ball hitch 18 is positioned proximate the side edge portions of the plates 26 and 30 which define the openings 28 and 32. Since the openings 28 and 32 are misaligned, the spherical portion 38 of the ball hitch 18 cannot pass through the openings 28 and 32 and the ball hitch is confined within the tube 16 for keeping the trailer 10 hitched to the tow vehicle 12.

Figure 5:
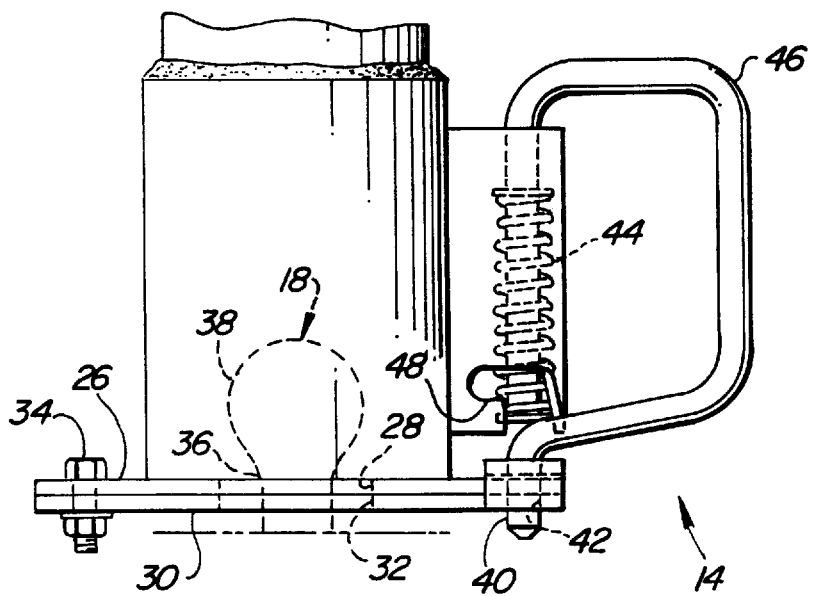
FIG. 5—is a side view of the tube and latch mechanism showing the handle in the lowered position and the pin positioned in its opening in the pivotal plate.

A mechanism is provided for securely maintaining the pivotal plate 30 in its latching position with the openings 28 and 32 misaligned. A pin member 40 is shiftably and pivotally mounted to the side of the tube 16. A pin opening 42 is defined within the pivotal plate 30 for receiving the pin 40. With the pin 40 positioned within the opening 42, as shown in FIGS. 3 and 5, the pivotal plate 30 is prevented or blocked from shifting to the position shown in FIG. 4 whereat the openings 28 and 32 are aligned. The pin 40 therefore prevents the pivot plate 30 from shifting to the position that would allow the trailer 10 to become unhitched. A spring 44 biases the pin 40 downwardly toward and into the opening 42 in the plate 30. A handle 46 is coupled with the pin 40 and can be grasped by an operator for shifting the pin 40 out of its opening 42 in the pivotal plate 30 for unhitching the trailer 10. A ledge or cradle 48 is also mounted to the side of the tube 16. The handle 46 can be lifted and pivoted to position a lower portion of the handle 46 within the cradle 48, as shown in FIG. 2. The cradle 48 holds the handle 46 in an upwardly shifted position whereat the pin 40 is removed from its opening 42 in the pivot plate 30. With the handle 46 held by the cradle 48, the pivot plate 30 can be swung about to the position shown in FIG. 4 to align the plate openings 28 and 32 for allowing the ball hitch 18 to exit the tube 16 during unhitching of the trailer 10 from the tow vehicle 12.

Figure 6:
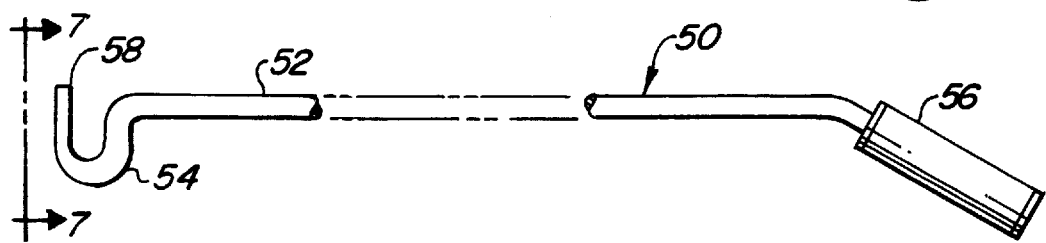
FIG. 6—is a side view of the elongated tool according to the present invention which is adapted for manipulating the handle and pivot plate of the fifth wheel hitch mechanism while the operator stands next to the towing vehicle.
Figure 7:
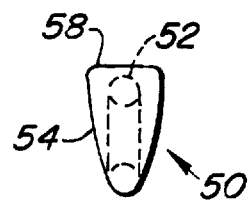
FIG. 7—is a view taken along 7—7 in FIG. 6.

The present invention provides a tool 50 for facilitating hitching of the fifth wheel type trailer 10 to a towed vehicle 12 while the operator stands next to the vehicle 12 and without requiring the operator to climb onto the vehicle 12. The tool 50 according to the present invention and as shown in FIG. 6 includes an elongate member or body portion 52 having a hooked portion 54 at one end and a handle portion 56 at the other end. This tool 50 allows an operator to manipulate and shift the handle 46 to and from its various positions. The tool 50 is elongated, and therefore allows the operator to reach the handle 46 with the tool 50 while standing on the ground next to the tow vehicle 12. The operator can also use the tool 50 to reach into the bed 22 of the truck 12 for pivoting the pivot plate 30 to and from its various positions as he stands on the ground next to the vehicle 12.

Next, the process of using the above described tool 50 according to the present invention will be described in greater detail. When hitching a fifth wheel trailer 10 to a truck 12, the door 24 that covers the ball hitch 18 must first be opened to expose the ball hitch 18. The operator can open the door 24 as he stands next to the bed 22 of the truck 12 by reaching across the bed 22 with the tool 50 to open the door 24 with the hooked portion 54 of the tool 50. With the ball hitch 18 exposed, the truck 12 can then be maneuvered such that the ball hitch 18 is positioned directly beneath the tube 16. With the pin 40, handle 46, and pivot plate 30 positioned as shown in FIG. 4, the front portion of the trailer 10 can then be lowered until the ball hitch 18 passes through the openings 28 and 32 in the plates 26 and 30 and is positioned within the tube structure 16.

The operator must then confine or capture the ball hitch 18 within the tube 16. He does this by engaging the hooked end portion 54 of the tool 50 against the side edge of pivotal plate 30 to swing the pivotal plate 30 to its ball hitch capturing position shown in FIG. 3. The pin 40 is held by the cradle 48 such that the pin 40 is held out of the pin hole 42, and therefore clearance is provided for pivoting the plate 30 from the position shown in FIG. 3 to that shown in FIG. 4. The hooked portion 54 includes a tip portion 58 which extends upwardly beyond the axis or body portion 52 of the tool 50 for allowing the hook 54 to easily engage the pivot plate 30. With the pivot plate 30 positioned as shown in FIG. 3 to align the pin opening 42 with the pin 40, the operator can then insert the hooked portion 54 beneath the handle 46 and lift the handle 46 from the cradle 48. Using the tool 50, the operator then pivots the handle 46 to the position shown in FIG. 3 and allows the handle 46 to drop down past the cradle 48. The spring 44 will bias the handle 46 and pin 40 downwardly toward the pivot plate 30. The pin 40 will therefore shift into the pin opening 42 in the pivot plate 30 for securing the pivot plate 30 in its position shown in FIG. 3 for confining the ball hitch 18 within the tube structure 16. The hitching process is now complete.

The tool 50 can also be used to unhitch the fifth wheel trailer 10 from the truck 12. While standing on the ground next to the truck 12, the operator can reach into the bed 22 of the truck 12 and push up on the handle 46 with the hook portion 54 of the tool 50. With the hook 54 engaged beneath the handle 46, the operator can use the tool 50 to lift and pivot the handle 46 into the cradle 48. The pin 40 is thereby removed from the pin opening 42 in the pivot plate 30 and the pivot plate 30 is free to pivot. The operator can then remove the hook 54 from beneath the handle 46 and can shift the pivot plate 30 with the hook portion 54 of the tool 50. Once the operator has shifted the pivot plate 30 to its position shown in FIG. 4 so that the openings 28 and 32 are generally aligned, the tube 16 can be lifted from the ball hitch 18, thereby allowing the tow vehicle 12 to pull away from the trailer 10. The operator can then use the tool 50 to reach into the bed 22 of the truck 12 and close the door 24 to thereby cover the ball hitch 18.

Figure 8:
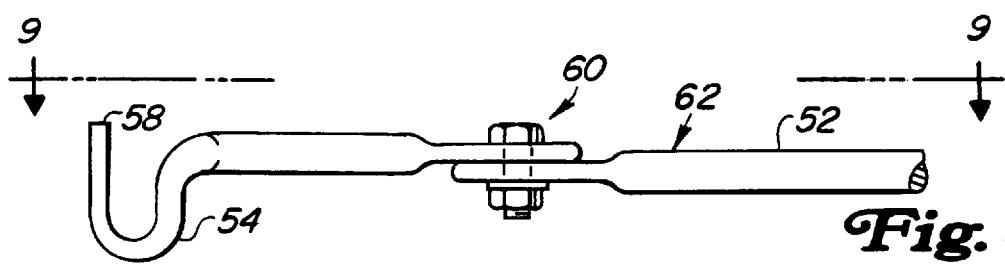
FIG. 8—is a side view of a tool according to the present invention and having a hinge mechanism which allows the hooked end portion of the tool to pivot with respect to the central body portion of the tool.
Figure 9:
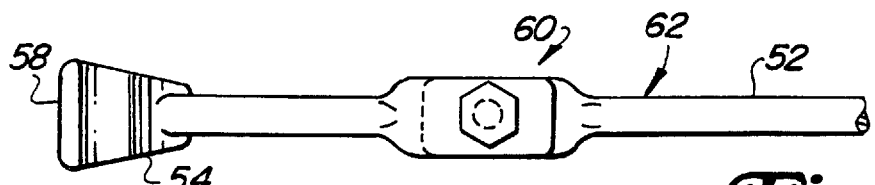
FIG. 9—is a top view of the tool shown in FIG. 8.

Referring now to FIGS. 8 and 9, there is shown an alternative embodiment of the present invention. A hinge means 60 is provided adjacent the hooked end portion 54 for allowing the hooked portion 54 to pivot with respect to the central body portion 52 and the handle grip 56 of the tool 50. The operator can pivot the hooked portion 54 about the hinge means 60 to thereby properly align the hooked portion 54 with the handle 46. The pivoted hooked portion 54 allows an operator to more easily position the hook 54 beneath the handle 46 when the handle 46 is in certain awkward positions. For example, FIG. 5 shows a handle 46 pivoted to a position that might make it somewhat awkward for the operator to position the hook 54 of the straight tool beneath the handle 46. The hinged end portion of the tool 50 shown in FIGS. 8 and 9, however, can be pivoted to allow the operator to easily place the hook 54 beneath the pivoted handle 46. Furthermore, some hitch mechanisms are configured such that the pin 40 is in front of the tube structure 16 and not to the side of the tube structure 16 as shown in FIG. 2. The hinged tool 62 shown in FIG. 8 and 9 allows the operator to easily position the hooked portion 54 beneath the handle 46 regardless of the position of the handle 46 and regardless of which side of the truck 12 the operator is standing.

Figure 10:
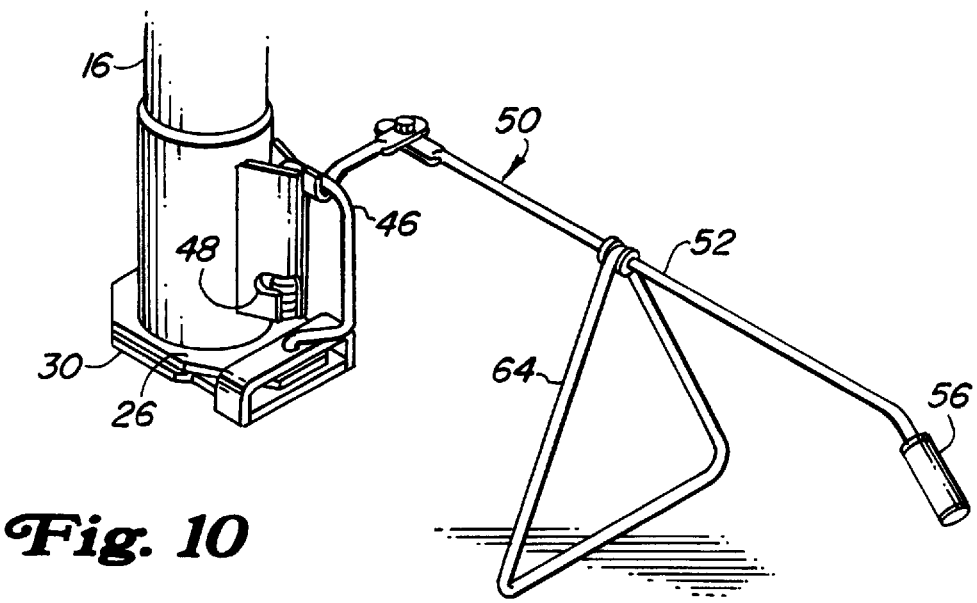
FIG. 10—is a perspective view of a tool according to the present invention having a fulcrum portion which is placed on a horizontal portion of the tow vehicle for allowing the tool to be used as a lever to increase the leverage and force applied to the handle.

Referring now to FIG. 10, there is shown a tool 50 according to the present invention and having a fulcrum member 64 pivotally coupled to the body portion 52 of the tool 50. When the operator wishes to lift the handle 46 with the tool 50 during the hitching and unhitching process, the operator can place the fulcrum 64 on a horizontal portion of the tow vehicle, such as the bed 22 of the truck 12 or the top edge of the sidewell of the truck. The operator then places the hook 54 beneath the handle 46. The operator can then press down on the handle portion 56 of the tool 50, and the body 52 of the tool 50 will act as a lever which presses upwardly on the handle 46. The presence of the fulcrum member 64 serves to increase the leverage which the operator can apply to the handle 46. The fulcrum member 64 therefore helps the operator overcome the downwardly directed force of the biasing spring 44 and allows the operator to lift the handle 46 more easily. The fulcrum member 64 is shown in FIG. 10 as being coupled to a hinged tool 62 as shown in FIGS. 8 and 9. However, the fulcrum 64 could also be coupled to the rigid tool 50 shown in FIGS. 2 and 6.

Having described the preferred embodiment, other features of the present invention will undoubtedly occur to those versed in the art, as will numerous modifications and alternations in the embodiments of the invention illustrated, all of which may be achieved without departing from the spirit and scope of the invention as defined in the appended claims.

What is claimed is:

1. A method for allowing an operator to couple and uncouple a trailer to a vehicle while standing next to the vehicle, said method comprising:

a) engaging a trailer lever with a hooked end portion of an elongate tool while grasping a handle portion of the tool;

b) manipulating the tool to shift the lever between first and second positions, wherein:

1) in the first position a portion of the lever engages a shiftable plate member for fixing the plate in a first position, and 2) in the second position the lever is disengaged from the plate and provides clearance for the plate to shift between first and second positions, wherein:

A) when the plate is in its first position the plate traps a ball hitch carried by the vehicle for generally coupling the trailer with the vehicle, B) when the plate is in its second position the plate allows clearance for a ball to become unhitched from the trailer;

c) disengaging the tool from the lever;

d) engaging the tool against the plate for shifting said plate between its first and second positions while the operator stands next to the vehicle.

2. The invention in accordance with claim 1, and further comprising:

a) pivoting the hooked portion of the tool with respect to the handle portion for allowing the operator to engage the hooked portion against the lever when the lever is in any of a plurality of pivoted positions.

3. The invention in accordance with claim 1, and further comprising:

a) placing a fulcrum portion of the tool on a generally horizontal portion of the vehicle before engaging the tool with the lever and plate;

b) pressing the handle portion downwardly while the fulcrum abuts the generally horizontal portion of the vehicle for increasing leverage with which the operator may shift the lever.

4. The invention in accordance with claim 1, and further comprising:

a) engaging the hooked portion of the tool against a portion of a door which when in a closed position generally covers and enclosed the vehicle ball hitch and when in an open position generally exposes the vehicle ball hitch for becoming hitched to the trailer;

b) manipulating the tool to shift the door between its open and closed position while standing next to the vehicle.

5. A method for allowing an operator to couple and uncouple a trailer to a vehicle while standing next to the vehicle, said method comprising:
   a) placing a fulcrum portion of a tool on a generally horizonal portion of the vehicle before engaging the tool with a lever and plate;
   b) pivoting a hooked portion of the tool with respect to a handle portion of the tool for allowing the operator to engage the hooked portion against the lever when the lever is in any of a plurality of pivoted positions;
   c) engaging the hooked end portion of the tool against the lever while grasping a handle portion of the tool;
   d) pressing the handle portion downwardly while the fulcrum portion abuts the generally horizontal portion of the vehicle for increasing leverage with which the operator may shift the lever;
   e) manipulating the tool to shift the lever between first and second positions while standing next to the vehicle, wherein:
      1) in the first position a portion of the lever engages a shiftable plate member for fixing the plate in a first position, and
      2) in the second position the lever is disengaged from the plate to shift between first and second positions, wherein:
         A) in the first position the plate traps a ball hitch carried by the vehicle for generally coupling the trailer with the vehicle, B) in the second position the plate allows clearance for the ball hitch to become unhitched from the trailer, f) disengaging the tool from the lever;
   g) engaging the tool against the plate for shifting said plate between its first and second positions while the operator stands next to the vehicle.

* * * * *